United States Patent [19]

Molari, Jr.

[11] 4,169,181

[45] Sep. 25, 1979

[54] IMPACT RESISTANT SOFT COATED LAMINATES AND PROCESS FOR MAKING THE SAME

[75] Inventor: Richard E. Molari, Jr., Pittsfield, Mass.

[73] Assignee: General Electric Company, Pittsfield, Mass.

[21] Appl. No.: 855,803

[22] Filed: Nov. 29, 1977

[51] Int. Cl.² ............... B32B 27/40; B32B 17/10; B32B 31/20

[52] U.S. Cl. ................. 428/217; 156/321; 427/316; 427/370; 427/385 B; 428/412; 428/425; 428/447; 428/911

[58] Field of Search ............... 428/412, 425, 426, 441, 428/409, 442, 447, 911, 217; 156/320–322; 427/314, 316, 370, 385 R, 385 B

[56] References Cited

U.S. PATENT DOCUMENTS

| | | | |
|---|---|---|---|
| 3,546,001 | 12/1970 | Giannone et al. | 427/314 |
| 3,657,057 | 4/1972 | Shorr et al. | 428/412 |
| 3,764,457 | 10/1973 | Chang et al. | 428/412 |
| 3,823,577 | 7/1974 | Smith | 428/412 |
| 3,953,115 | 4/1976 | French et al. | 428/412 X |
| 3,979,548 | 9/1976 | Schafer et al. | 428/425 |
| 4,010,311 | 3/1977 | Lewis et al. | 428/426 X |
| 4,015,094 | 3/1977 | Ranney et al. | 428/447 X |
| 4,027,072 | 5/1977 | Molari | 428/412 |
| 4,027,073 | 5/1977 | Clark | 428/412 |
| 4,035,548 | 7/1977 | Chang et al. | 428/412 |
| 4,079,160 | 3/1978 | Philipson | 428/412 X |
| 4,081,581 | 3/1978 | Littell | 428/911 X |
| 4,121,014 | 10/1978 | Shaffer | 428/412 |
| 4,123,588 | 10/1978 | Molari | 428/442 X |

*Primary Examiner*—Harold Ansher
*Attorney, Agent, or Firm*—Morgan, Finnegan, Pine, Foley & Lee

[57] ABSTRACT

Improved impact or shock resistant soft coated laminates including a back polycarbonate lamina opposite the direction of impact or shock, such polycarbonate lamina having a soft overlying or exposed layer or coating opposite the direction of impact, are provided. The laminates exhibit excellent resistance to failure and spalling of the polycarbonate surface opposite the impact or shock receiving surface.

The soft coat is a self-healing, chemically resistant polyurethane having an excess of free hydroxyl groups over isocyanate groups and confers on the laminates excellent scratch resistance, good resistance against swelling and stress cracking while at the same time the laminates exhibit good clarity and integrity in addition to good chemical and permeation resistance, as well as resistance to failure and spalling. The process employs the polyurethane in film form as a cap sheet.

27 Claims, No Drawings

IMPACT RESISTANT SOFT COATED LAMINATES AND PROCESS FOR MAKING THE SAME

This invention relates to improved impact resistant laminates. More particularly, it relates to such laminates having a plurality of layers or laminae including a back polycarbonate layer opposite the direction of impact or shock, such polycarbonate layer having thereon an exposed soft, coating layer, of a self-healing, chemically resistant polyurethane having an excess of free hydroxyl groups over isocyanate groups. The laminates are particularly characterized by resistance to spalling or other failure of the back or downstream polycarbonate surface when the laminates are subject to impact.

BACKGROUND OF THE ART

Safety glazing or penetration resistant glazing for structural items such as windows, windshields and the like utilizing polycarbonate or polysiloxane-polycarbonate with resinous layers as their structural components are well known Glass-polycarbonate resin laminates are disclosed in U.S. Pat. No. 3,666,614, the glass and polycarbonate being sealed or joined together by an ethylene-vinyl acetate copolymer. In U.S. Pat. No. 3,520,768, there are disclosed laminates of relatively thick glass utilizing a thin polycarbonate foil disposed between glass sheets as the cohering material. In addition, there are known laminates wherein self-healing, chemically resistant polyurethane films or layers are adhered to glass, as for example, in U.S. Pat. No. 3,979,548. Moreover, there are also known, as disclosed in U.S. Pat. No. 4,027,072, laminates comprising polycarbonates and glass or polysiloxane-polycarbonate block copolymers, described more particularly hereinafter as the adhesive, and glass in various combinations and in which an ultraviolet, mar resistant, hard coat is utilized on at least one external surface or both external surfaces of such laminates. These last-mentioned laminates are particularly useful in structural items such as bullet resistant glass, windshields, windows and as transparencies for gas masks and the like. It is normal practice in constructing certain of such laminates to utilize glass or relatively hard solid resinous materials as the impact shock receiving layers while utilizing polycarbonate as the back or inner or downstream layer or that presented to the person or object being protected. In those cases where polycarbonate is used as a layer of a laminate, it is often, because of the relative softness of the polycarbonate, protected, especially on its exposed surface, with a mar- or scratch-resistant and transparency preserving layer usually less than 2 mils thick and preferably from about 0.05 to 1 mil thick. The minimum thickness is restricted only by application technology and the desired durability of the mar-resistant coating. Maximum acceptable coating thickness is a function of the relative brittleness of the mar-resistant finish. The inner surface can also be so coated to prevent marring during lay-up and the like. In general, such mar-resistant layers, which are well known, can be metal oxides; modified melamines; ultra-violet hardenable organics such as acrylated monomers or mixtures of these monomers with acrylate-modified polymeric resins; inorganic glasses such as silica or alumina; polyurethanes; filled and unfilled silicone resins with recurring organic groups such as polymethyl methacrylate; polyamide ester resins; and ion-beam deposited carbon, and all of which, among others are harder and relatively more brittle than the underlying polycarbonate layer which they protect. It was found, however, that in impact shock-resistant laminates utilizing such relatively brittle layers along with polycarbonate, the relatively brittle material cracks under impact causing the polycarbonate layers and particularly the rear-most polycarbonate layer to spall, causing damage to exposed objects behind the laminate. Such spalling occurs because of the so-called "notch sensitive" character of polycarbonates. Thus, if an overlying brittle layer is broken, the fracture lines propagate to the polycarbonate and act as "critical" notches causing the polycarbonate to fail in a brittle manner with little of the energy absorption typical of this normally impact-resistant material.

Such disadvantages were overcome by providing impact shock resistant laminates using polycarbonate and overlying relatively more brittle material of specific thicknesses, thus achieving laminates which exhibit reduced notch sensitivity and thereby making them more useful from a practical point of view.

It is to be noted, however, that although the known laminates are useful in many areas such as, for example, those mentioned, they still present certain disadvantages even though they are chacterized by superior penetration and spall resistance as well as being relatively light in weight and having good clarity, strength and integrity over a wide range of temperatures. For example, these known laminates are relatively thick and very often, after prolonged use asymmetrical glass/polycarbonate laminates, in particular, show evidence of swelling, stress cracking, and even delamination. Furthermore, in such laminates which utilize polycarbonates, interlayers of adhesive are generally necessary for bonding the polycarbonates to glass or other structural materials. However, the interlayers or adhesives employed often have low adhesion to polycarbonates or are incompatible therewith, thus resulting in delamination, hazing and stress cracking.

Consequently, there exists a need for improved impact or shock resistant laminates which exhibit superior penetration and spall resistance and which, at the same time, are relatively thin, light in weight and have good clarity, strength and integrity over a wide range of temperatures and which at the same time provide abrasion, chemical and permeation resistance. The present invention provides such materials or laminates.

DESCRIPTION OF THE INVENTION

In accordance with the present invention there is provided impact shock-resistant laminates comprising a plurality of laminae including a back polycarbonate layer and a soft overlying or exposed layer or coating, opposite the direction of impact, of a self-healing, chemically resistant polyurethane having an excess of free hydroxyl groups over isocyante groups. Such laminates can be used in sheet form and laid up in layers of the specific materials being utilized for each layer to form the laminates.

Generally, the polyurethane employed in carrying out this invention is, as mentioned, a self-healing and chemically resistant polyurethane having an excess of free hydroxyl groups over isocyanate groups and which can be adhered to solid substrates, as solid resinous materials, structural materials and particularly, for example, glass, as well as being bondable to polycarbonates. A particularly preferred useful self-healing and chemically resistant polyurethane is described in U.S. Pat. No. 3,979,548, the teachings of which are incorporated herein by reference. More specifically, such polyurethanes are preferably those having an excess of free hydroxyl groups over isocyanate groups and are curable materials containing (1) a polyglycol ether resulting from the condensation of propylene oxide with trimethylolpropane and having about 10.5 percent to about 12.5 percent free hydroxyl groups and (2) a biuret of 1,6-hexamethylene diisocyanate having about 21 percent to about 22 percent isocyanate groups, the weight ratio of the biuret to the polyglycol ether being about 0.9 to 1.1. Although one would expect that such less rigid and incompletely cross-linked structures would be more easily scratched, the opposite is the case, while at the same time the mechanical characteristics thereof are also made more durable to heat treatment.

Insofar as polycarbonate resins are concerned, it is to be noted that a wide variety of the same may be utilized in the laminates of this invention, such polycarbonates including but not being limited to those described in U.S. Pat. Nos. 3,161,615; 3,220,973; 3,312,659; 3,312,660; 3,313,777; 3,666,613; and 3,189,662, this last-mentioned patent also disclosing polycarbonate block copolymers with polysiloxane, the use thereof in laminates being disclosed in U.S. Pat. No. 4,027,072, the teachings of all of which patents are incorporated herein by reference.

Generally any of the conventional adhesives can be employed as an interlayer between the laminae utilized in making a laminate according to this invention. However, the preferred interlayer is a polysiloxane-polycarbonate copolymer.

Exemplary conventional adhesives which may be used in the laminate of this invention include polyvinylbutyrals, ethylene terpolymers, epoxies, polyurethanes, silicones, acrylics, and ethylene acrylic acids, among others. The interlayer in contact with any polycarbonate ply and most specifically the polycarbonate backply must provide not only good adhesion but also must be chemically compatible with the sensitive polycarbonate. As previously mentioned, however, the preferred interlayer for contact with the polycarbonate laminae is a polysiloxane-polycarbonate block copolymer. Particulary useful polysiloxane-polycarbonate block copolymers which can be utilized in the laminates of this invention are those disclosed in the last two mentioned patents above and which have the average formula:

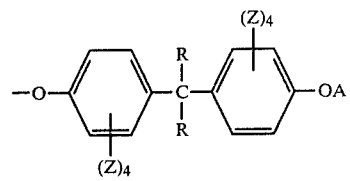

A is a member selected from the class of hydrogen and

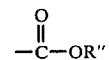

R is a member selected from the class of hydrogen, monovalent hydrocarbon radicals and halogenated monovalent hydrocarbon radicals, R' is a member selected from the class of monovalent hydrocarbon radicals and cyanoalkyl radicals, R" is a member selected from the class consisting of monovalent hydrocarbon radicals and halogenated hydrocarbon radicals, and Z is a member selected from the class of hydrogen, lower alkyl radicals and halogen radicals and mixtures thereof.

Included within the radicals represented by R of Formula I are aryl radicals and halogenated aryl radicals such as phenyl, chlorophenyl, xylyl, tolyl, etc.; aralkyl radicals such as phenylethyl, benzyl, etc.; aliphatic, haloaliphatic and cycloaliphatic radicals such as alkyl, alkenyl, cycloalkyl, haloalkyl including methyl, ethyl, propyl, chlorobutyl, cyclohexyl, etc.; R can be all the same radical or any two or more of the aforementioned radicals, while R is preferably methyl, R' includes all radicals included by R above except hydrogen, where R' can be all the same radical or any two or more of the aforementioned R radicals except hydrogen, and R' is preferably methyl. R' also includes, in addition to all the radicals included by R, except hydrogen, cyanoalkyl radicals such as cyanoethyl, cyanobutyl, etc., radicals. Radicals that are included within the definition of Z of Formula 1 are hydrogen, methyl, ethyl, propyl, chloro, bromo, iodo, etc. and combinations thereof, and Z is preferably hydrogen.

The hydrolytically stable copolymers useful in the present invention can be further described as comprising

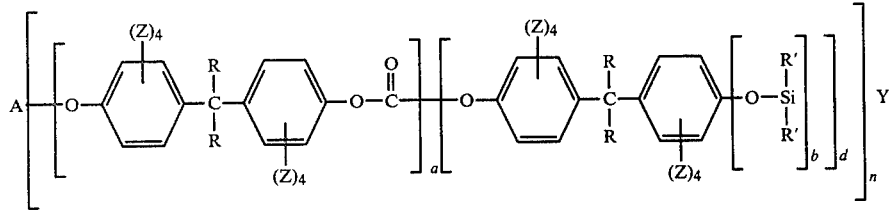

wherein n is at least 1, and preferably n is an integer equal to from 1 to about 1000, inclusive, a is equal to from 1 to about 200, inclusive, and preferably b has an average value from about 15 to about 90, inclusive, while the ratio of a to b can vary from about 0.05 to about 3 inclusive, and when b has an average value of from about 15 to about 90 inclusive, the ratio of a to b is preferably from about 0.067 to about 0.45, inclusive, and d is 1 or more, Y is ing recurring copolymeric units of a polydiorganosiloxane joined by substituted aryloxy-silicon linkages to a polyester or dihydric phenol and a precursor of carbonic acid, where each of said recurring copolymeric units comprises by average weight from about 10 to about 75% of the polydiorganosiloxane, and preferably from about 40 to 70% by weight.

The copolymers of Formula I can be produced by reacting at temperatures in the range of 0° to 100° C., preferably 20° to 50° C., and in the presence of an acid acceptor, a mixture of a halogen chain-stopped polydiorganosiloxane having the formula

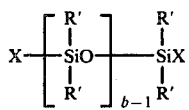

and a dihydric phenol having the formula

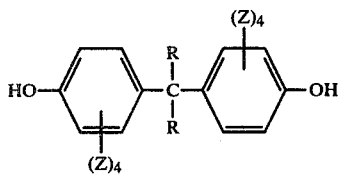

and thereafter phosgenating said reaction product until the resulting copolymer achieves a maximum intrinsic viscosity, where R, R', Z and b are as defined above, and X is a halogen radical, preferably chloro.

The halogen chain-stopped polydiorganosiloxanes of Formula II can be made by conventional procedures such as by the controlled hydrolysis of a diorganodihalosilane, for example, dimethyldichlorosilane as taught in Patnode U.S. Pat. No. 2,381,366 and Hyde U.S. Pat. Nos. 2,629,726 and 2,902,507.

Another procedure that can be employed involves equilibrating a mixture of a diorganodichlorosilane and a cyclic polydiorganosiloxane in the presence of a metal catalyst such as ferric chloride as shown in Sauer U.S. Pat. No. 2,421,653. Although the various procedures utilized in forming the halogen chain-stopped polysiloxane are not critical, generally it has been found desirable to maintain the halogen content of the resulting halogen chain-stopped polysiloxane in the range of about 0.4 to about 35% by weight, and preferably in the range of from about 1 to about 10% by weight of the halogen chain-stopped polysiloxane. The halogen chain-stopped polysiloxane is preferably in the form of a chlorinated polydimethylsiloxane.

Dihydric phenols that are included in Formula III are, for example, 2,2-bis(4-hydroxyphenyl)-propane (bis-phenol-A); 2,4'-dihydroxydiphenylmethane; bis-(2-hydroxyphenyl)-methane; bis-(4-dihydroxyphenyl)-methane; 1,1-bis-(4-hydroxyphenyl)-ethane; 1,2-bis-(4-hydroxyphenyl)-ethane; 1,1-bis(4-hydroxy-2-chlorophenyl)-ethane; 1,1-bis(2,5-dimethyl-4-hydroxyphenyl)-ethane; 1,3-bis-(3-methyl-4-hydroxyphenyl)-propane; 2,2-bis-(3-isopropyl-4-hydroxyphenyl)-propane, etc. Mixtures can also be used. Others will occur to those skilled in the art.

The copolymers described essentially comprise recurring units consisting of a polydiorganosiloxane interconnected by substituted aryloxy-silicon linkages to a polyester of carbonic acid precursor and a dihydric phenol.

Materials of the above nature are also described in U.S. Pat. No. 3,189,662 included herein by reference and can be used either alone as such or in conjunction with well known modifiers to provide particular desired characteristics.

Illustrative of the above block copolymers is General Electric LR-3320. This material has a specific gravity of 1.12, a tensile strength of 2500 to 3900 psi, an elongation of 230 to 430, a tear strength (Die C) of 230–430 lbs./in., a brittleness temperature below −76° F. and a heat deflection temperature (10 mils under 66 psi load) of 160° F.

Another such block copolymer, specifically General Electric LR-5630, has a specific gravity of 1.07, a tensile strength of 2200 to 2500 psi, an elongation of 500–700%, a tear strength (Die C) of 200 lbs/in., and a brittleness temperature below −76° F. and a heat deflection temperature (66 psi) of 130° F.

While the above U.S. Pat. No. 3,189,662 states that the above block copolymers are useful as binding materials for parts and laminates and in adhesive formulations, it was unexpectedly found that when such materials are used in sheet form and laid up into laminates variously with other materials such as polycarbonates, other resins and glass, they provide not only excellant adhesive properties but in effect enter into and enhance the laminate structure, providing improved strength and ductility over an extremely wide range of temperatures. These physical characteristics, accompanied over such wide range of temperatures by salutary weather resistance and optical clarity, make them particularly useful in so-called safety glazing applicatins where resistance to penetration and spalling from the impact of flying objects such as bullets, rocks, missiles and the like is desirable. It is to be understood, of course, that while optical clarity and lack of color are desirable in many cases, one or more of the layers of the laminates can be tinted or colored as desired to provided light screening and the like. It is also to be understood that light and heat stabilizers can be employed where indicated.

While laminates using polycarbonates, or block copolymers as an adhesive and structural layer, as disclosed in U.S. Pat. No. 4,027,072, are laminates which are characterized by good properties over a wide range of temperatures, particularly as compared to usual high penetration resistant laminates, such as those using polyvinyl butyral as the interlayer in glass laminates they are enhanced even more advantageously by using the polyurethanes described hereinabove as part of the laminate structure as a soft protective outer coating or film on the inboard or polycarbonate layer opposite the direction of impact. The further enhancement of such laminates is even more unexpected since the utilization of the described polyurethanes therein confers a further degree of toughness thereto which permits the use of a smaller number of individual layers in such laminates and which individual layers can be made less thick than heretofore while at the same time providing to such laminates without deleteriously affecting the favorable properties thereof resistance to high impact such as by bullets or flying objects.

A wide variety of other materials can be used as the front or impact shock receiving layers in fabrication of the laminates of this invention. Such other materials include solid resinous materials, glass, and solid structural materials. The solid structural materials include wood, ceramics, metals, cermets and the like. Moreover, any of the usual types of glass used in so-called safety applications can be employed in conjunction with the other materials in fabricating the laminates of the present invention, including thermally strengthened or tempered glass, as well as common untempered glass.

The solid resinous materials which may be used in the laminates of this invention include ABS plastics based on combinations of acrylonitrile, butadiene and styrene; acetal homopolymers acetal copolymers produced by polymerization of trioxane and ethylene oxide; acrylics;

rubber modified acrylics; epoxy resins; nylons, such as those prepared from a diamine and a diacid and those prepared from an amino acid or amino acid derivative; phenolics; polycarbonates; phenylene oxide based resins, such as polyphenylene oxide and blends of polyphenylene oxide and styrene resins; polyaryl ethers, polyesters, polyethylenes; polyphenylene sulfides; polypropylene; polysulfones; polyurethanes; silicones; ethylene polymers, such as ethyl vinyl acetates; conductive plastics; and ordered aromatic copolymers and the like. These solid resinous materials can be formed into sheets and employed as other additional materials in fabricating the laminates of this invention and include in addition to the previously mentioned polycarbonates, the materials described in U.S. Pat. No. 3,622,440 which is incorporated herein by reference.

Where a polycarbonate layer without further description or designation is mentioned herein, it is the polycarbonate of bisphenol-A or 2,2-bis(4-hydroxyphenol) propane.

Where desirable, adhesion promoting primers can be used to promote adhesion, such materials being well known and including among others, vinyl alkoxy silanes, amino-alkoxy silanes, alkoxy silanes, silyl peroxides and amino-alkylalkoxy silanes. Such materials are described in the previously mentioned U.S. Pat. No. 3,666,614 and elsewhere. It is to be noted, however, that a particularly advantageous feature and unexpected result of the present invention is that primers or protective layers, dependent upon the particular order of the laying up of the various lamina in a given laminate, are not needed, the above described polyurethanes fulfilling these needs. For example, a laminate having a polycarbonate interlayer or polycarbonate-polysiloxane interlayers can be simply laid up with inboard and outboard polyurethane coating films or layers and no primer or other protective layers are necessary. On the other hand, as a practical matter a primer coat between the polyurethane coat and polycarbonate surface to which it is adhered is preferably employed in order to enhance bonding.

While there are no limitations on the thickness or size of the laminates or on the number of layers that may be employed in the preparation of the same, it is a feature of this invention that the laminates comprise as small a number of lamina as possible thus providing thin, tough laminates which still exhibit all of the advantages of the relatively thick laminates of a similar type that are currently known. In this connection, it is to be noted that in its simplest form, this invention comprises a single piece of polycarbonate laminated or coated with a soft overlying or exposed layer or coating, opposite the direction of impact, of a self-healing, chemically resistant polyurethane having an excess of free hydroxyl groups over isocyanate groups. This two-ply laminate of polycarbonate and soft-coat may be used by itself to provide impact protection, or in series with other impact resistant structures such as laminated glass. In the former case, it would be desirable to employ a mar-resistant hard or soft-coat such as the aforementioned self-healing polyurethane on the impact receiving or forward facing surface. In the latter case, the laminated safety glass or other impact receiving medium would preferably be glazed in a common mounting with an air space separating this safety glazing material from the polycarbonate to polyurethane softcoat laminate. The multiple glazed unit so described is especially suitable for lightweight ballistics protection in vehicles providing maximum resistance to penetration at minimal thickness; for example, less than ½ inch, and weight in a transparent product with excellent mar and chemical resistance on both exterior surfaces. In this connection, it is to be noted that the laminates of this invention can be made thin enough, while still exhibiting advantageous properties, such as impact resistance to bullets or missiles, to fit easily into standard size glass frames, such as, for example, 1 3/16" glass frames used in architectural applications. Furthermore, while the predominant material in a laminate is polycarbonate and/or other material which provides the thickness in a given laminate, the thicknesses of the polyurethane soft coat and adhesive, such as block copolymer interlayer also are factors thereof. While such materials should be employed in an amount to provide at least enough thereof to carry out their functions, the actual thickness of sheets or films thereof may vary widely and while not critical is generally up to about 2 to 50 mils thick.

The polycarbonate or polysiloxane, glass or other solid structural material and solid resinous materials may be used in any combinations so long as at least a polycarbonate lamina, soft coated with the polyurethane is present at least as an inboard lamina and preferably a polysiloxane-polycarbonate layer is present as an interlayer when additional forward facing polycarbonate lamina are employed. Thus, the laminate may contain, for example, as coating, a film of the polyurethane, layer of polycarbonate, an interlayer of polysiloxane-polycarbonate and a layer of other material which may be a single ply layer of the polyurethane, solid resinous material, solid structural material or an ultra-violet, mar resistant hard coating or film. On the other hand, it is to be understood that the layer of other material may also be a multi-ply layer of the polyurethane, solid resinous material, solid structural material and ultra-violet, mar-resistant, hard coating or film and in which case any two or more of the mentioned components may be present in the multi-ply layer as individual plies. Furthermore, in such a case, the polyurethane when present as a component in such multi-ply layer may be and preferably is disposed outboard, or alternatively, employed as an individual interply, it being further understood that when the polyurethane is disposed as the outboard ply then the ultra-violet, mar-resistant, hard film or coating is generally not employed in the combination, the function thereof being performed by the polyurethane, although the mar-resistant hard film or coating is preferably present in cases where outboard layer of the laminate will be subjected to ultra-violet light such as sunlight. Among the preferred laminates of this invention are those having one or more layers of polycarbonate with preferably polysiloxane-polycarbonate disposed between layers of the polycarbonate and the inboard polycarbonate lamina coated with the described polyurethane; laminates having the same disposition of layers as mentioned except that they can also have on the outboard layer an ultra-violet, mar-resistant hard coating or film rather than the polyurethane; laminates having a polysiloxane-polycarbonate interlayer disposed between polycarbonate layers which are in turn provided with outboard and inboard coats of the polyurethane and including laminates having the same disposition of layers except that the outboard coat of polyurethane can also be provided with stabilizers for ultra-violet protection and those laminates having an interlayer of polysiloxane-polycarbonate disposed between layers of the polyurethane and an inboard polycarbonate ply coated with the polyurethane soft-coat and having an outboard layer of glass in which case the internally disposed layer of polyurethane in essence acts as a primer, thus eliminating the need for a separate primer layer between the polysiloxane-polycarbonate layer and the glass.

On the other hand, it is a feature of this invention that the laminates thereof are most preferably made with a minimum number of layers each of which generally can be relatively thin, thus providing laminates having an overall greatly reduced thickness and which at the same time still provide excellent resistance to failure and spalling when subjected to impact such as, for example, by bullets, against the outboard lamina. In this respect, an example of a most preferred laminate in accordance with this invention is a two-ply laminate comprising a layer of polycarbonate bonded on its exterior surface, opposite the direction of impact, to a ply of the above-described polyurethane. A further example of a most preferred laminate in accordance with this invention is a four ply laminate comprising an outboard layer of polycarbonate an interlayer of polysiloxane-polycarbonate and an inboard layer of polycarbonate bonded on its outer surface to a ply of the above-described polyurethane. A further example of a most preferred laminate is a six ply laminate having three polycarbonate layers separated by two interlayers of polysiloxane-polycarbonate with the inboard polycarbonate layer bonded to a ply of the described polyurethane.

It is to be understood also and as previously mentioned that if desirable the impact receiving surface of a laminate of this invention can be coated with a relatively hard mar-resistant coating or the described polyurethane.

It is to be further understood that the laminates of this invention may be bonded to other materials such as fiberglass reinforced plastic board, particle boards and the like which may be used for walls, partitions or other solid barriers and the like.

In preparing the laminates of this invention, the laminae or layers are laid up as desired and bonded by using pressure and/or heat or via the cast-in-place technique. The bonding can be accomplished by the use of presses, autoclaves, rollers, vacuum bags and the like all of such devices being known in the art.

On the other hand, it will be appreciated that in accordance with this invention, it is a unique feature thereof that in manufacturing the laminates thereof, the polyurethane in the form of a film is applied in line to the polycarbonate layer as a cap sheet as the polycarbonate layer is extruded. In this respect, a wide variety of primers, such as those mentioned hereinabove, can be employed in order to enhance the bonding of the polyurethane film to the polycarbonate. A particularly useful primer is one comprising 6.8% trimethylolpropane, 21.4% diethylene glycol, 38% azelaic acid and 33.8% Mobay E-262 (De Soto urethane) which is applied to either the polycarbonate or polyurethane sheets in any convenient manner prior to mating of the polycarbonate and polyurethane materials such as by spreading, pouring and smoothing with a doctor blade so that it has a thickness of from about 500 Å to about 2000 Å.

Generally, a process for making an impact and shock-resistant laminate in accordance with this invention comprises applying a polyurethane film having an excess of free hydroxyl groups over isocyanate groups to a polycarbonate layer, laying up the coated polycarbonate layer as an inboard lamina with additional structural layers and adhesive interlayers as desired, subjecting the laid up layers to heat and/or pressure and forming a laminate having a soft coated polyurethane inboard layer of polycarbonate. More specifically, a process for making a laminate in accordance with this invention, comprises applying a primer to a polyurethane film having an excess of free hydroxyl groups over isocyanate groups, applying the primed film as a cap sheet to a polycarbonate sheet, laying up the coated polycarbonate sheet as an inboard lamina with additional sheets as desired, of other materials separated by adhesive interlayers, subjecting the laid up sheets to heat and/or pressure and forming a laminate having a soft coated polyurethane inboard layer of polycarbonate. More particularly, the process comprises applying a primer in a thickness in a range of about 500 Å to about 2000 Å to a film of polyurethane having an excess of hydroxyl groups, over isocyanate groups applying the primed film to a polycarbonate sheet, laying up the coated polycarbonate sheet as an inboard lamina with additional other sheets as desired, of other materials separated by adhesive interlayers and subjecting the laid up sheets to a temperature in a range of from about 250° F. to about 300° F. and a pressure in a range of from about 50 psi to about 200 psi and forming a laminate having a soft coated polyurethane inboard layer of polycarbonate.

In accomplishing the described process the laid up sheets are held in the autoclave, press or other suitable apparatus over widely varying periods of time. In general, the laid up sheets are held in the apparatus at least for a sufficient period of time to complete lamination. The particular time periods utilized in carrying out the process for any given configuration of laid up sheets is readily determinable by routine testing.

DESCRIPTION OF THE PREFERRED EMBODIMENTS

In order to illustrate the present invention more fully, the following examples thereof are set forth. It is to be understood that these examples are illustrative only and are not to be construed as limiting the invention to the particular embodiments set forth therein. In the examples all parts and percents are by weight unless otherwise indicated.

EXAMPLE 1

This example illustrates a laminate of this invention which is 12"×12" in size and having three plies of polycarbonate and an overall nominal thickness of 1.18".

There is laminated in a standard air pressurized autoclave, utilizing tempered glass coated with mold release on its inward facing surfaces, at a temperature of 250° F. and at a pressure of 140 to 150 psi and a hold time of 45 minutes a laminate consisting of two ½" thick sheets of General Electric 9030 polycarbonate and as an inboard lamina a ⅛" thick sheet of General Electric 9030 polycarbonate soft coated on its exposed surface with a 20 mils thick polyurethane film having an excess of hydroxyl groups over isocyanate groups prepared as set forth hereafter. In addition, the polycarbonate sheets are separated by two pieces of 17 mils thick General Electric LR-3320 polysiloxane-polycarbonate block copolymer. The block copolymer has a specific quantity of 1.12, a tensile strength of 2500 to 3900 psi, an elongation of 230 to 430, a tear strength (Die C) of 230 to 430 lbs/in., a brittleness temperature below −76° F.

and a heat deflection temperature (10 mils under 66 psi load) of 160° F.

The polyurethane employed is prepared as follows:

At a temperature between about 65° F. and 120° F. there is added to a mixing vessel 1000 grams of polyglycol ether resulting from the condensation of propylene oxide with trimethylolpropane, having a molecular weight of about 450 and containing 10.5–12% free hydroxyl groups. To the polyglycol ether there is added 23 grams of 2,6-di-(tertiary butyl)-p-cresol as a stabilizer and 0.5 grams of dibutyltin dilaurate as an accelerator. After the ingredients are mixed, 1000 grams of the biuret of 1,6-hexamethylene diisocyanate having 21–22% isocyanate groups is added to the mixture which is then carefully stirred to avoid formation of air bubbles or blisters and then poured on one surface of a glass sheet to form a film about 20 mils thick. The coated glass sheet is then heated in an oven for 15 minutes at about 285° F. to cure the polyurethane. The polyurethane film so prepared is stripped from the glass sheet and used as a cap sheet on the polycarbonate in laying up the laminate after priming with the above described primer at a thickness of about 500 Å. The laminate as formed is then subjected to the UL 752 Standard test for resistance to bullets. Tests are performed at room temperature, 120° F., and on one side at −25° F. according to the standard, the impact receiving surface being the uncoated ½" General Electric 9030 polycarbonate layer. When the laminate is subjected to super power 0.44 magnum bullets there is no penetration or spalling with a three shot pattern or a fourth close spacing shot. Backside (inboard) deflections are small, the soft coated polyurethane polycarbonate lamina being entirely ductile.

It is to be noted that in comparison to known laminates of the same type which have like properties, the laminate of this example is a distinct improvement having a nominal thickness of only 1.18" and containing three plies of polycarbonate and two interlayers of polysiloxane polycarbonate while the known laminates contain four to five polycarbonate plies and have a nominal thickness of 1.34". An example of such a configuration would be seven plies in the following sequence: ⅛" polycarbonate, 17–34 mil LR3320, ½" polycarbonate, 17 mil LR3320, ½" polycarbonate, 17–34 mil LR3320, ⅛" polycarbonate coated with a hard mar resistant topcoat on its outside surface. Although this known configuration will also meet the requirements of the UL 752 Standard, it contains two additional plies, is approximately 0.16 inches thicker, and weighs one pound more at 8.3 lbs. than the laminate of this invention which weighs only 7.3 lbs.

When a known laminate is made to the exact configuration of the laminate of this invention as set forth in this example but with the substitution of a hard mar-resistant coating on the inboard polycarbonate ply for the polyurethane softcoat as described in this invention; that is, the following configuration: ½" uncoated polycarbonate, 17 mil LR3320, ½" polycarbonate, 17 mil LR3320, ⅛" polycarbonate coated with a hard mar resistant coating on its outside surface only, the resulting known laminate fails to pass the U.L. 752 Standard test. This laminate, when shot at with an 0.44 magnum, as prescribed by the "super power" test, the slug being directed against the ½" impact receiving surface chilled to −25° F., fails to pass the UL 752 requirements, demonstrating considerable spalling with brittle failure of the hard-coated ⅛" polycarbonate back ply especially under such cold test conditions.

Thus, the laminate of this invention has superior ballistics performance to comparable hard-coated laminates and yet exhibits excellent scratch resistance and is suitable for use in bank interiors or teller windows and the like. It is to be noted that the addition of a mar-resistant surface, either known hard coats or the self-healing urethane, to the impact receiving surface of the laminate of this example would have no deleterious effect on the ballistics performance of the laminate.

EXAMPLE 2

The procedure of EXAMPLE 1 is repeated except that there is employed only two plies of ½" General Electric 9030 polycarbonate and 1 piece of 17 mils thick General Electric LR-3320 disposed between the polycarbonate plies, thus providing a laminate having an overall nominal thickness of 1.04".

The laminate so formed is subjected to the same impact test, with medium power 0.38 super automatic bullets, the impact receiving surface being the uncoated ½" polycarbonate layer. No penetration or spalling with a three shot pattern or a fourth close spacing shot is noted when tested at conditions simulating −25° F. on the impact receiving surface. Backside (inboard) deflections were almost non-existent, the soft-coated polyurethane polycarbonate lamina being entirely ductile.

In comparison to known laminates of the same type which have like properties, the laminate of this example is a distinct improvement having a nominal thickness of only 1.04" and containing only two plies of polycarbonate and one interlayer of polysiloxane-polycarbonate while the known laminates contain four plies of polycarbonate and have a nominal thickness of 1.085".

When a known laminate is made to the exact configuration of the laminate of this invention as cited in this example, but with the substitution of a hard, mar-resistant coating on the inboard ½" polycarbonate ply for the polyurethane self-healing, soft coat, as described in this invention, the resulting known laminate when tested at conditions simulating −25° F. on the impact receiving surface fails to pass the UL 752 Standard test for "medium" power small arms. When shot at with an 0.38 super automatic as prescribed by the "medium power" test, this known laminate fails, demonstrating considerable spalling with brittle failure of the hard-coated ½" polycarbonate back ply.

Moreover, the laminate of this example having a soft inboard coating of polyurethane is suitable for use in areas empolying punch-out windows and the like. Furthermore, while the laminate of this example requires only one piece of polysiloxane-polycarbonate, the known laminates of similar type which pass the UL 752 Standard test require as many as three to five pieces of the same. In addition, the soft-coated polyurethane surface of the laminate exhibits excellent scratch resistance and is suitable for use in bank interiors or teller windows and the like. It is to be noted that the addition of a mar-resistant surface, either a known hard coat or the self-healing polyurethane, to the impact receiving surface of the laminate of this example would have no deleterious effect on the ballistics performance of the laminate.

EXAMPLE 3

The procedure of EXAMPLE 1 is repeated except that a symmetrical laminate having three sheets of 3/8" General Electric 9030 polycarbonate is employed. Moreover, impact tests with 0.44 magnum super power bullets produces results like those of EXAMPLE 1, there being no evidence of penetration or spalling.

EXAMPLE 4

The procedure of EXAMPLE 1 is once again repeated except that the laminate formed is like that of EXAMPLE 2 and a coating about 0.15 mils thick of relatively brittle mar-resistant General Electric MR-1029 is applied to the outboard lamina of General Electric 9030 polycarbonate, and the soft polyurethane coat is reduced to 10 mils thickness, thus the overall nominal thickness of the laminate remains the same while at the same time insuring improved ultra-violet stability and providing a laminate useful for outdoor exposure. Impact testing of this laminate with 0.38 super medium power bullets provides results similar to those achieved with the laminate of EXAMPLE 2.

EXAMPLE 5

This example illustrates a multiple glazed configuration utilizing conventional laminated safety glass in combination with soft-coated polycarbonate in a single frame. The safety glass is made by conventional means using two pieces of nominal 3/32 inch float glass laminated together with 30 mil polyvinyl butyral at 270° F. and 100-150 psi in an air autoclave after pretacking. One side of a ⅜" thick sheet of polycarbonate is bonded to a preprimed 10 mil thick polyurethane softcoat film having an excess of hydroxyl over isocyanate groups prepared as described in EXAMPLE 1. The bonding is accomplished at 250° F. using a polished roll to uniformly apply pressure on the two materials to lay down the polyurethane film on the polycarbonate sheet. The final construction is approximately ⅜" thick and consists of a nominal 215 mil thick safety glass laminate as the forward facing unit, an air space of approximately 1/32" and a rear unit of ⅜" polycarbonate coated on its exterior or rear facing surface with a 10 mil layer of the polyurethane soft coat.

No penetration is experienced after one shot at the safety glass laminate side using the following weapons ammunition: 9 mm Automatic (4" barrel), 38 Super Automatic (5" inch barrel), and 22 rifle. All shots are made from within 15'. This thin, lightweight configuration provides ballistic penetration protection with mar and chemical resistance on both surfaces and excellent UV protection afforded to the polyurethane on the interior surface. It is to be noted that the polyurethane could be applied to both surfaces of the polycarbonate without effecting the ballistics performance of the laminate described in this example. It should be further noted that the polycarbonate sheet coated on both surfaces with the polyurethane soft coat is a useful article used independently of the laminated glass front ply for such applications as interior partitions in vehicles such as taxi cabs, and for bank teller windows and the like.

EXAMPLE 6

The procedure of EXAMPLE 2 is repeated except that the following laminate configuration is employed: ¼ inch acrylic sheet, 17 mils LR3320, ¼" acrylic, 17 mils LR3320, ½" 9030, and 20 mils soft coat on the rear surface. The two ¼" acrylic sheets replace the single ½" 9030 polycarbonate front ply of EXAMPLE 2. This laminate, when tested for ballistics resistance with the acrylic side receiving the impact, exhibits properties similar to the laminate of EXAMPLE 2.

The laminates of this invention are generally useful in the field of glazing and particularly where impact resistance to bullets, rocks and other missiles or flying objects is desirable. Resistance to impact, shock, penetration and spalling, especially on the inboard side, provides protection from flying chunks or splinters of glass.

The present laminates are particularly useful in the field of security glazing, such glazing being used in banks or in place of bars or metal reinforced glass or combinations of glass and bars in penitentiaries or other similar applications. Moreover, if desired, the laminates can be provided with conductive materials such as interlaid wire which when and if interrupted actuates a security alarm. Security glazing without the alarm feature can also be provided simply by the omission of the alarm wire. Conductive layers can also be employed in the laminates of this invention and such electrical inserts can be used for defogging. The laminates of this invention can also be employed in the construction of telephone and waiting booths, bank windows, lenses, lighting fixtures, vending machines, decorative glazing and the like.

Furthermore, the laminates of this invention are especially useful in applications where resistance to impact and shock from high speed, forceful missiles such as bullets is desirable, as for example, in taxi cab partitions, tellers' windows and the like.

In the field of security glazing the laminates comply with American National Institute Standard, ANSI Z97.1-1972, there being no fracture of the glazing surface after repeated impacts at the 400 ft./lb. energy level. Numerous other advantages of the laminates of this invention will be readily apparent to those skilled in the art.

Numerous modifications and variations of this invention may be made without departing from the spirit and scope thereof. It is to be understood, therefore, that this invention is not to be limited to the embodiments disclosed herein except as defined in the appendant claims.

I claim:

1. An impact and shock-resistant laminate comprising a plurality of laminae including a back polycarbonate layer and a soft, overlying, exposed layer, opposite the direction of impact, of a self-healing, chemically resistant polyurethane having an excess of free hydroxyl groups over isocyanate groups.

2. A laminate according to claim 1 including a mar-resistant coating on the exposed, impact receiving surface of the polycarbonate layer.

3. A laminate according to claim 2 wherein the mar-resistant coating is a self-healing chemically resistant polyurethane having an excess of free hydroxyl groups over isocyanate groups.

4. An impact and shock-resistant laminate comprising a plurality of laminae including a back polycarbonate layer coated with a soft, overlying, exposed layer, opposite the direction of impact, of a self-healing, chemically resistant polyurethane having an excess of free hydroxyl groups over isocyanate groups, at least one layer of other material and at least one interlayer of a compatible adhesive.

5. A laminate according to claim 4 wherein the adhesive interlayer is polysiloxane-polycarbonate block copolymer.

6. A laminate according to claim 4 wherein the adhesive interlayer is a polysiloxane-polycarbonate block copolymer having the average formula:

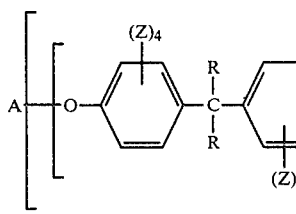

wherein n is at least 1, a is equal to from 1 to about 200 inclusive, b has an average value from about 15 to about 90, the ratio of a to b can vary from about 0.05 to about 3 inclusive d is 1 or more, y is

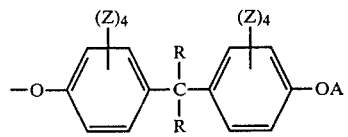

A is a member selected from the group consisting of hydrogen and

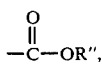

R is a member selected from the group consisting of hydrogen, monovalent hydrocarbon radicals and halogenated monovalent hydrocarbon radicals, R' is a member selected from the group consisting of monovalent hydrocarbon radicals and cyanoalkyl radicals, R" is a member selected from the group consisting of monovalent hydrocarbon radicals and halogenated hydrocarbon radicals, and Z is a member selected from the group consisting of hydrogen, halogen and lower alkyl radicals and mixtures thereof.

7. A laminate according to claim 6 wherein in formula I n is an integer equal from 1 to about 1000 inclusive and the ratio of a to b is from about 0.067 to about 0.45 inclusive.

8. A laminate according to claim 4 wherein the other material is polycarbonate.

9. A laminate according to claim 4 wherein the other material is solid resinous material.

10. A laminate according to claim 9 wherein the solid resinous material is an acrylic resin.

11. A laminate according to claim 4 wherein the other material is glass.

12. A laminate according to claim 4 including a mar-resistant coating on the exposed surface of the other material.

13. A laminate according to claim 12 wherein the mar-resistant coating is a self-healing, chemically resistant polyurethane having an excess of free hydroxyl groups over isocyanate groups.

14. A laminate according to claim 4 which is symmetrical.

15. A laminate according to claim 14 including a mar-resistant coating on the exposed surface of the other material.

16. A laminate according to claim 15 wherein the mar-resistant coating is a self-healing, chemically resistant polyurethane having an excess of free hydroxyl groups over isocyanate groups.

17. An impact and shock-resistant laminate comprising a plurality of laminae including a back polycarbonate layer coated with a soft, overlying exposed layer, opposite the direction of impact, of a self-healing, chemically resistant polyurethane having an excess of free hydroxyl groups over isocyanate groups, a polysiloxane-polycarbonate block copolymer adhesive interlayer and an outboard layer of polycarbonate.

18. A laminate according to claim 17 including a mar-resistant coating on the exposed surface of the outboard polycarbonate layer.

19. A laminate according to claim 18 wherein the mar-resistant coating is a self-healing, chemically resistant polyurethane having an excess of free hydroxyl groups over isocyanate groups.

20. An impact and shock-resistant laminate comprising a plurality of laminae including a back polycarbonate layer coated with a soft, overlying exposed layer, opposite the direction of impact, of a self-healing, chemically resistant polyurethane having an excess of free hydroxyl groups over isocyanate groups, an outboard layer of polycarbonate, a layer of polycarbonate disposed between the back and outboard polycarbonate layers and polysiloxane-polycarbonate adhesive interlayers between said polycarbonate layers.

21. A laminate according to claim 20 including a mar-resistant coating on the exposed surface of the outboard polycarbonate layer.

22. A laminate according to claim 21 wherein the mar-resistant coating is a self-healing, chemically resistant polyurethane having an excess of free hydroxyl groups over isocyanate groups.

23. A process for making an impact and shock-resistant laminate comprising applying a polyurethane film having an excess of free hydroxyl groups over isocyanate groups to a polycarbonate sheet layer with the application of heat.

24. A process according to claim 23 including subjecting the laid up layer to pressure.

25. A process for making an impact and shock-resistant laminate comprising applying a primer to a polyurethane film having an excess of free hydroxyl groups over isocyanate groups, applying the primed film as a cap sheet to a polycarbonate sheet, subjecting the laid up sheets to heat and pressure and forming a laminate having a soft coated polyurethane inboard layer of polycarbonate.

26. A process for making an impact and shock-resistant laminate comprising applying a primer in a thickness in a range of about 500 Å to about 2000 Å to a polyurethane film, having an excess of free hydroxyl over isocyanate groups, applying the primed polyurethane film as a cap sheet to a polycarbonate sheet and subjecting the laid up sheets to a temperature in a range of from about 250° F. to about 300° F. and a uniform pressure for a time sufficient to laminate said laid up sheets and forming a soft coated polyurethane inboard layer of polycarbonate.

27. A process according to claim 26 wherein the primer comprises 6.8% trimethylolpropane, 21.4% diethylene glycol, 38% azelaic acid and 33.8% urethane.

* * * * *